(12) United States Patent
Saeki et al.

(10) Patent No.: US 9,490,900 B2
(45) Date of Patent: Nov. 8, 2016

(54) METHOD TO PRODUCE OPTICAL MODULE HAVING MULTIPLE SIGNAL LANES AND OPTICAL MODULE

(71) Applicant: Sumitomo Electric Industries, Ltd., Osaka-shi (JP)

(72) Inventors: Tomoya Saeki, Yokohama (JP); Munetaka Kurokawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/707,468

(22) Filed: May 8, 2015

(65) Prior Publication Data

US 2015/0333833 A1 Nov. 19, 2015

(30) Foreign Application Priority Data

May 13, 2014 (JP) ................................. 2014-099315

(51) Int. Cl.
*H04B 10/50* (2013.01)
*H04J 14/02* (2006.01)
*G02B 6/42* (2006.01)

(52) U.S. Cl.
CPC ............ *H04B 10/503* (2013.01); *G02B 6/425* (2013.01); *G02B 6/4206* (2013.01); *G02B 6/4214* (2013.01); *G02B 6/4215* (2013.01); *G02B 6/4244* (2013.01); *G02B 6/4257* (2013.01); *G02B 6/4265* (2013.01); *H04J 14/02* (2013.01); *Y10T 29/49897* (2015.01)

(58) Field of Classification Search
CPC ........ H04B 10/503; G02B 6/32; G02B 6/42; G02B 6/4206; G02B 6/4214; G02B 6/4215; G02B 6/4244; G02B 6/425; G02B 6/4257; G02B 6/4265; H04J 14/02; Y10T 29/49897
See application file for complete search history.

(56) References Cited

U.S. PATENT DOCUMENTS

| | | | | |
|---|---|---|---|---|
| 2,165,341 A | * | 7/1939 | Capstaff | G02B 7/10 359/641 |
| 5,604,630 A | * | 2/1997 | Palmer | G02B 23/12 359/355 |
| 5,787,215 A | * | 7/1998 | Kuhara | H01L 31/12 257/E31.095 |
| 6,404,955 B1 | * | 6/2002 | Kikuchi | G02B 6/32 385/35 |
| 6,731,659 B1 | | 5/2004 | Tsai et al. | |

(Continued)

FOREIGN PATENT DOCUMENTS

| | | |
|---|---|---|
| JP | 2006-139060 A | 6/2006 |
| JP | 2006139060 A * | 6/2006 |

(Continued)

OTHER PUBLICATIONS

Office Action in U.S. Appl. No. 14/831,492, dated Apr. 21, 2016.

*Primary Examiner* — Peter Radkowski
(74) *Attorney, Agent, or Firm* — Venable LLP; Michael A. Sartori; Laura G. Remus

(57) ABSTRACT

A method to produce an optical module, which includes more than one signal lanes each providing a semiconductor laser diode (LD), a first lens, and a second lens, is disclosed. The method first places the first lens in a position at which the optical beam output from the LD becomes a collimated beam, then, slightly shifts so as to be apart from the LD to convert the optical beam into a concentrated beam. The second lens is first placed in a position at which the optical beam from the first lens becomes a collimated beam, then, shifted so as to be apart from the first lens such that the optical output get through the coupling fiber becomes within a preset range.

8 Claims, 7 Drawing Sheets

(56) References Cited

U.S. PATENT DOCUMENTS

| | | | |
|---|---|---|---|
| 8,625,989 B2 * | 1/2014 | Du | G02B 6/4215 398/43 |
| 2004/0114883 A1 * | 6/2004 | Furuichi | G02B 6/4206 385/93 |
| 2010/0214639 A1 * | 8/2010 | Watson | G02B 21/002 359/213.1 |
| 2012/0189306 A1 * | 7/2012 | Du | G02B 6/4215 398/65 |

FOREIGN PATENT DOCUMENTS

| JP | 2007-212795 A | | 8/2007 |
|---|---|---|---|
| JP | 2007212795 A | * | 8/2007 |

* cited by examiner

US 9,490,900 B2

METHOD TO PRODUCE OPTICAL MODULE HAVING MULTIPLE SIGNAL LANES AND OPTICAL MODULE

BACKGROUND

1. Field of the Invention

The present application relates to a method to produce an optical module that implements a plurality of signal lanes and an optical module produced by the method.

2. Background Arts

An optical transmitter module sometimes causes the optical power exceeding a limit, which is ruled from a viewpoint of, for instance, the eye safety, when a laser diode (LD) installed in the optical transmitter module and provided with an adequate bias current is strongly coupled with an external optical fiber. When the bias current is adjusted or decreased to reduce the optical output power, the LD lowers the resonant frequency, which means that the high frequency performance of the optical transmitter module degrades.

One solution has been proposed; that is, the optical transmitter module shifts the focal point of the LD from the end of the optical fiber. Specifically, when the external optical fiber, which receives the light output from the LD, couples with the optical module by an optical connector, the proposed solution is that the optical connector, exactly, the end of the optical fiber is physically shifted from the focal point of the light output from the LD. The deviation of the end of the optical fiber from the focal point varies a portion of the optical beam entering within the core of the optical fiber, thus, the output power of the light output from the optical fiber may be reduced. This mechanism has been often called as the de-focusing.

In an optical module capable of outputting an optical signal multiplexing a plurality of optical beams depending on wavelengths thereof, the de-focusing above described for one of optical beams may be carried out properly. However, this de-focusing for the one optical beam is not always adequate for rest of the optical beams. Respective optical beams couples with the optical fiber passing respective lanes or optical coupling systems independent of the others. Accordingly, respective optical beams are not always coupled with the optical fiber by a same angle or a same condition for the one of the optical beam subject to the de-focusing.

SUMMARY OF THE INVENTION

An aspect of the present invention related to a method to produce an optical module that provides a semiconductor laser diode (LD) as a light source, a first lens coupled to the LD, a second lens coupled to the first lens, a third lens coupled to the second lens and a coupling fiber coupled to the third lens. The optical module of the invention outputs an optical signal through the coupling fiber. The method comprises steps of: (a) placing the first lens in a first position at which the first lens converts an optical beam output from the LD into a collimated beam; (b) shifting the first lens along an optical axis connecting the LD to the first lens so as to be apart from the LD by a preset distance; (c) placing the second lens in a second position at which the second lens converts the optical beam output from the first lens and passing through the second lens into a collimated beam; and (d) adjusting optical power output through the coupling fiber to be within a preset range by shifting the second lens from the second position toward the third lens.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments according to the present invention will be described as referring to drawings. In the description of the drawings, numerals or symbols same with or similar to each other will refer to elements same with or similar to each other without duplicated explanations.

Figure 1:
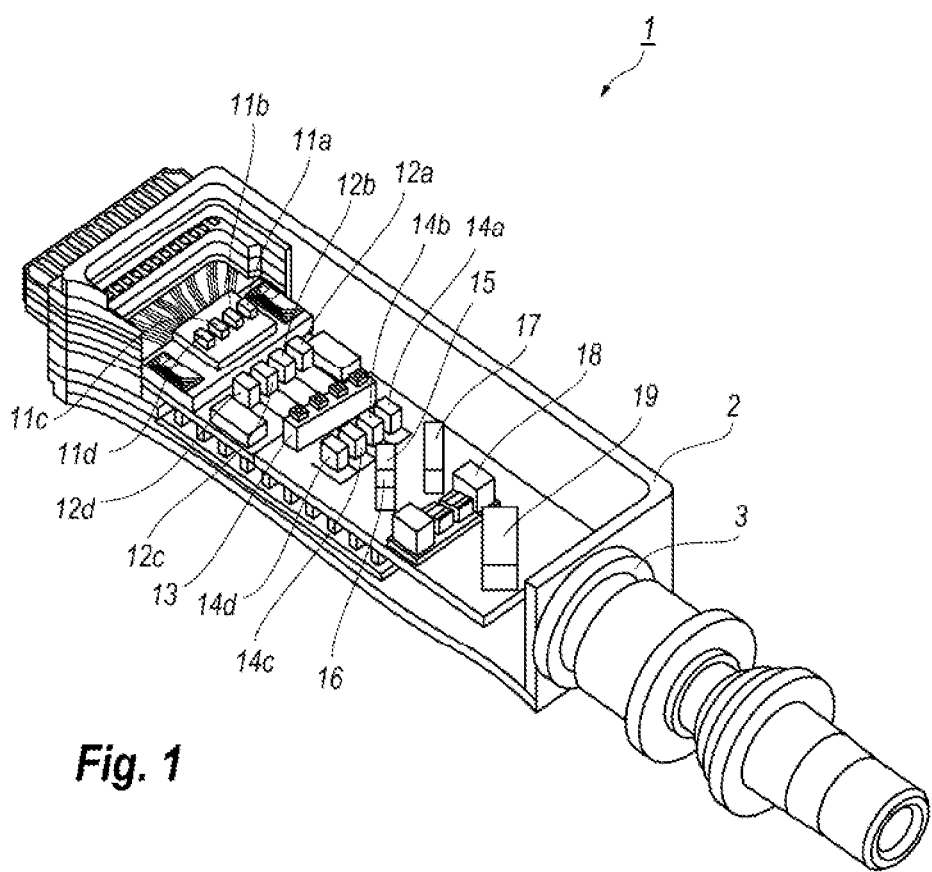
FIG. 1 shows an inside of an optical module of the present embodiment.
Figure 2:
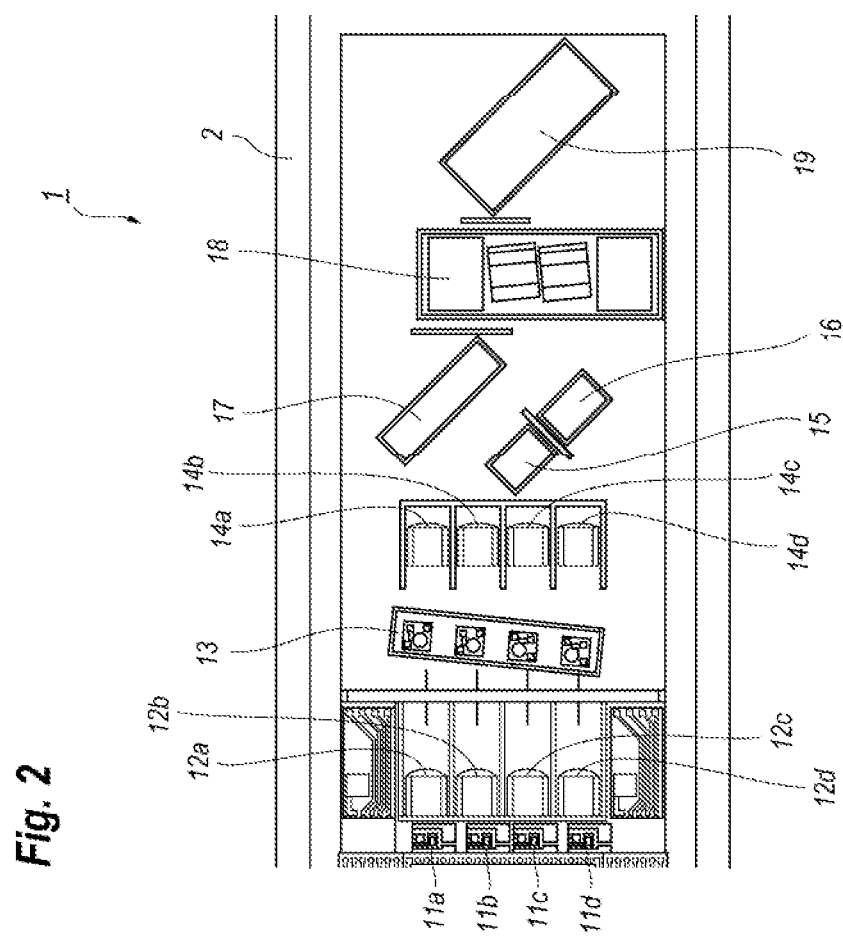
FIG. 2 is a plan view showing the inside of the optical module.

FIG. 1 shows an inside of an optical module of the present embodiment and FIG. 2 is a plan view showing the inside of the optical module. The optical module 1 of the embodiment, which is a type of the light-transmitting module that provides a box-shaped housing 2 and a cylindrical sleeve unit 3 with a flange, has a plurality of signal lanes, in the present optical module shown in FIGS. 1 and 2 has four lanes. Specifically, the optical module 1 includes in the hosing 2, four laser diodes (LDs), 11a to 11d, four first lenses, 12a to 12d, a beam splitter (BS) 13, four second lenses, 14a to 14d, two wavelength division multiplexing (WDM) filters, 14 and 15, a reflector 17, an isolator 18, and a polarization beam combiner (PBC) 19. One of LDs, 11a to 11d, one of the first lenses, 12a to 12d, and one of the second lenses correspond to the signal lane.

Description below assumes that the front correspond to the side where the sleeve unit is provides and the rear corresponds to the opposite. However, these assumptions are only for the explanation sake and would not determine the scope of the invention at all.

The optical module 1 drives respective LDs, 11a to 11d, independent of each other. That is, respective LDs, 11a to 11d, may emit optical beams independent of others. The first lenses, 12a to 12d, concentrate respective optical beams towards the second lenses, 14a to 14d. The second lenses, 14a to 14d, may convert thus entering optical beams into respective collimated beams. Respective focal points of the second lenses, 14a to 14d, in the side of the first lenses, 12a to 12d, substantially coincide with respective focal points of the first lenses, 12a to 12d, in the side of the second lenses, 14a to 14d. Thus, divergent beams output from the LDs, 11a to 11d, may be converted into respective collimated beams by the first and second lenses. The optical system of the optical module 1 processes these collimated beams.

Figure 3:
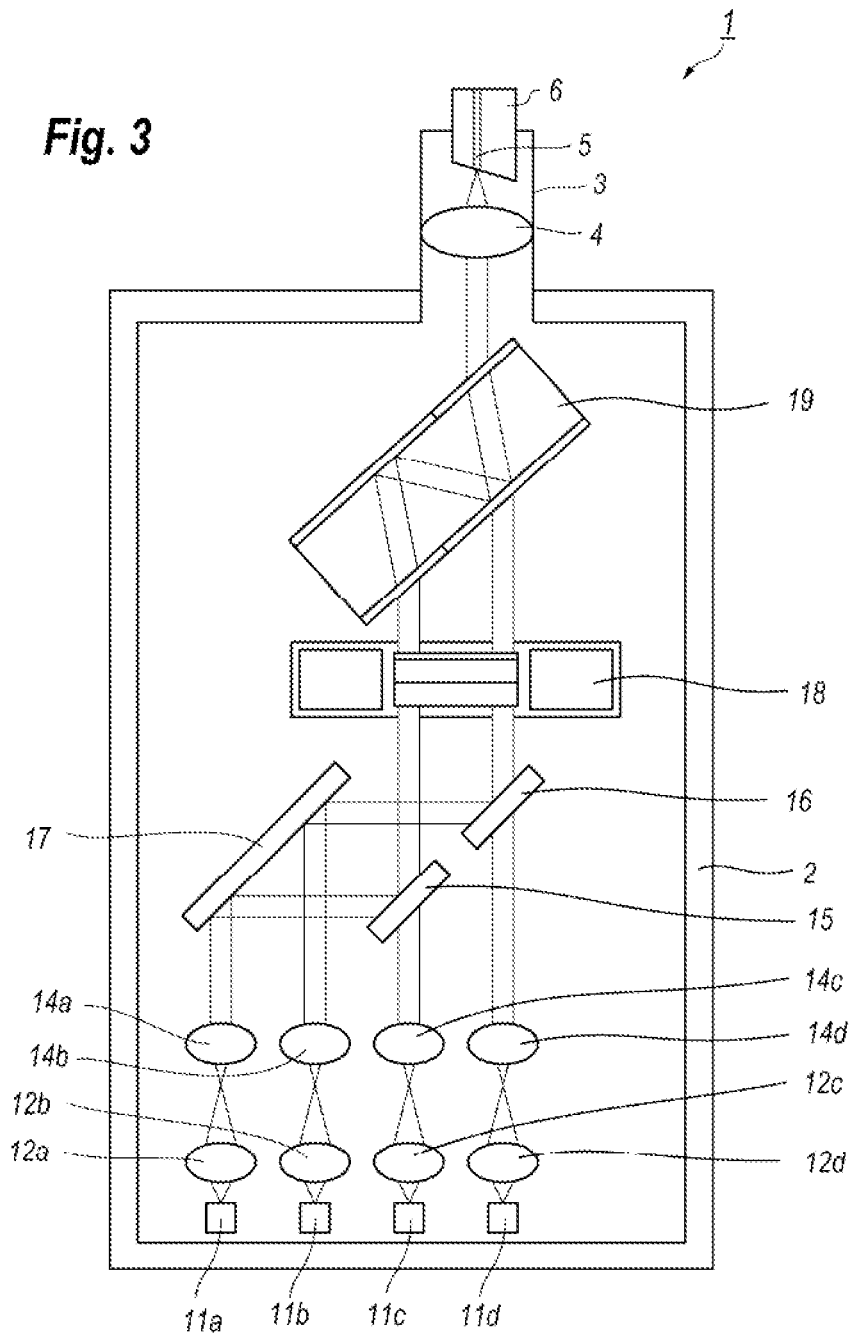
FIG. 3 schematically illustrates the optical coupling system of the optical module of the present embodiment.

FIG. 3 schematically illustrates the optical system of the present embodiment. The collimated beams output from the second lenses, 14a to 14d, are multiplexed by the optical system including the WDM filters, 15 and 16, the reflector 17, the isolator 18, and the PBC 19; and output to the sleeve unit 3 through the window 2a provided in the front wall of the housing 2. The sleeve unit 3 installs a third lens 4 and a stub 6 therein. The third lens 4 concentrates thus processed collimated beam on an end of a coupling fiber 5 secured in the center of the stub 6.

A conventional module, that is, a conventional transmitter module has adjusted optical output power thereof by deviating the position of the end of the coupling fiber from a position at which the maximum power is obtained, that is, the focal point of the concentrating lens, which is often called as the de-focusing. On the other hand, the optical module of the present embodiment also carries out the de-focusing for controlling the optical coupling efficiency to the coupling fiber but the de-focusing is carried out by the second lenses, 14a to 14d, the collimating lens, not the concentrating lens close to the coupling fiber. The second lenses, 14a to 14d, are implemented for respective lanes. Accordingly, the de-focusing in one lane does not influence the de-focusing of the other lanes.

In the optical module of the present embodiment, the LDs, 11a to 11d, generate optical beams, which are divergent beams. The second lenses, 14a to 14d, collimate those divergent beams into respective collimated beams. Respective collimated beams are multiplexed by the optical system installed in the downstream of the second lenses, 14a to 14d, and the third lens concentrates the multiplexed beams onto the end of the coupling fiber. Thus, as long as respective collimated beams enter within an effective area of the third lens, the collimated beams may couple with the end of the coupling fiber even the second lenses, 14a to 14d, deviate from respective positions at which the divergent beams are converted into the collimated beams.

An LD directly driven by an ordinary driving signal may emit light with average power of around 10 dBm. The optical system from the LD to the end of the coupling fiber inevitably shows an optical coupling loss of about 2 to 3 dB. Accordingly, the optical power output from the coupling fiber becomes about 7 to 8 dB. On the other hand, one standard for the 100 G-base LR4 determined by IEEE defines the maximum optical power to be 4.5 dBm. Accordingly, the optical module inherently shows an overpowered condition without any adjustment of the optical coupling efficiency to the coupling fiber 5.

A conventional method to compensate the optical output power is to shift the end of the coupling fiber from the focal point of the third lens, which is often called as the de-focusing technique. However, this technique is effective for only one lane. When the optical module includes more than two lanes and each lane optically couples with the end of the coupling fiber independently, that is, each lane practically shows respective tolerances with respect to the end of the coupling fiber, it becomes quite hard to perform the de-focusing technique evenly for all lanes.

Figure 7:
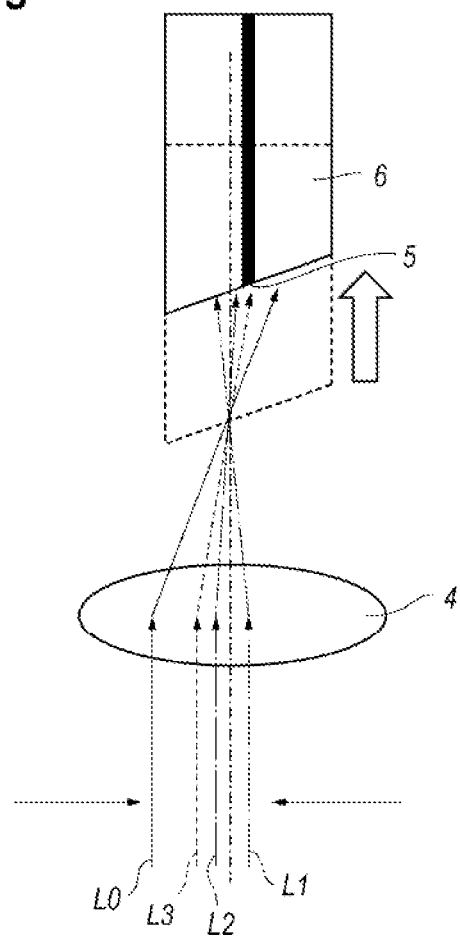
FIG. 7 schematically illustrates a mechanism to cause a failure in the conventional de-focusing alignment.

Reasons of the tolerance or the scattering of the optical coupling efficiency will be specifically explained as referring to FIG. 7. When the collimated optical beams enter the third lens 4, the concentrating lens, and the optical axes of respective beams deviate from the axis of the third lens, the incident angles of respective optical beams with respect to the end surface of the coupling fiber become different for optical beams. However, the optical axes of respective beams are within the effective range of the third lens, the third lens 4 may concentrate respective optical beams onto the end of the coupling fiber 5.

However, when the coupling fiber in the end surface thereof shifts from the focal point of the third lens to adjust the optical power output from the optical module, the coupling efficiency of respective collimated beams to with the coupling fiber may not be equally varied because of uneven incident angles for respective optical beams. De-focusing the position of the end of the coupling fiber from the focal point for one of the optical beams to get an adequate output power, the coupling efficiencies of the rest of the optical beams sometimes become inadequate.

Next, a method to get an adequate optical coupling efficiency for all optical beams independently will be specifically described. FIG. 3 schematically illustrates the optical coupling system of the optical module of the present embodiment. As shown in FIG. 3, the optical module of the embodiment adopts the three lens system, that is, the first lenses, 12a to 12d, concentrate the optical beams each generated by the LDs, 11a to 11d, by the magnification ratio of 5 to 6, where the magnification ration of 5 to 6 is known to be an optimum ratio to couple the optical output of a distributed feed-back (DFB) laser diode (LD) with a single mode fiber (SFM). The second lenses, 14a to 14d, collimate the optical beams concentrated by the first lenses, 12a to 12d. The third lens 4 provided outside of the housing 2, namely, inside of the sleeve unit 3, concentrates the collimated beams output from the housing 2 onto the coupling fiber 5.

The first lenses, 12a to 12d, have focal lengths of 0.45 mm and the magnification ratio of 5 to 6. The second lenses, 14a to 14d, have focal lengths of 0.85 mm and the magnification ratio of unity. The third lens 4 has a focal length of 0.85 mm and the magnification ratio of unity. Because the second and third lenses, 14a to 14d and 4, have the magnification ratio of unity, while, the first lenses, 12a to 12d, have the magnification ratio greater than 1; the first lenses, 12a to 12d, are necessary to be precisely aligned. On the other hand, the second lenses, 14a to 14d, have the magnification ratio relatively smaller than that of the first lenses, 12a to 12d, that is, the second lenses, 14a to 14d, become dull for the optical alignment and applicable to adjust the optical coupling efficient against the coupling fiber 5.

Also, even when the optical system is configured to be a collimated system, the collimating lens is necessary to be aligned by accuracy within 0.3 µm when the collimated optical system is the two-lens system. On the other hand, the collimated optical system is the three-lens system as those of the present embodiment, the positional accuracy of the second lens is moderated to be 1.5 µm. When the optical components in the collimated optical system are fixed by adhesive such as ultraviolet curable resin after the optical alignment thereof, the hardening of the adhesive or the resin inevitably accompanies with shrinkage thereof. Accordingly, those optical components are hard or substantially impossible to assemble or fix by the accuracy less than 1 µm.

Moreover, the first lenses, 12a to 12d, with the magnification ratio of 5 to 6 may reduce a diameter or a field size of the optical beam collimated by the second lenses, 14a to 14d. In the present lens system of the embodiment, the field size of the collimated beam becomes 0.6 mm φ or less, or reduced to be almost 0.2 mm in a diameter thereof.

Next, a method to align lenses in the optical module 1 will be described. First, the LDs, 11a to 11d, are fixed on respective positions and wired to be electrically activated. Then, subsequent alignment processes, specifically, aligning the first lenses, 12a to 12d, against respective LDs, 11a to 11d; setting the second lenses, 14a to 14d, against the first lenses, 12a to 12d, in respective initial positions; and shifting the second lenses, 14a to 14d, to get adequate coupling efficiency with the third lens; are carried out.

Figure 4A:
FIG. 4A shows a process to align the first lens against the LD.

In the description below, the process exemplarily selects the first lane of the first LD 11a, the first lens 12a, and the second lens 14a. The other lanes from the second to fourth lanes may be carried out in the same manner with the first lane. As shown in FIG. 4A, the first lens 12a is aligned against the LD 11a. This process uses a special alignment tool having two mirrors each making an angle of 45° against the optical axis of the LD 11a and being set in parallel to each other. The special alignment tool is a type of a periscope. Setting this special tool for the optical beam passing the first lens 12a may be guided outside of the optical module 1. Also, a monitoring device, typically an infrared camera, is set far apart from the optical module 1, for instance, one meter (1 m) apart from the optical module 1. Then, investigating the optical beam passing the first lens 12a and extracted outside of the optical module by the special tool described above. Guiding the optical beam output from the first lens 12a to the monitoring device 30 by the special tool, the first lens 12a is aligned such that the monitored beam becomes a collimated beam.

When the first lens 12a makes a collimated beam, the first lens, or a focal point in the side of the LD 11a is just on the point from which the optical beam is emitted. Offsetting the first lens 12a from the point at which the first lens makes the collimated beam by a preset distance so as to be apart from the LD 11a, the first lens 12a behaviors as a concentrating lens with the magnification ratio of about five (5).

Figure 4B:
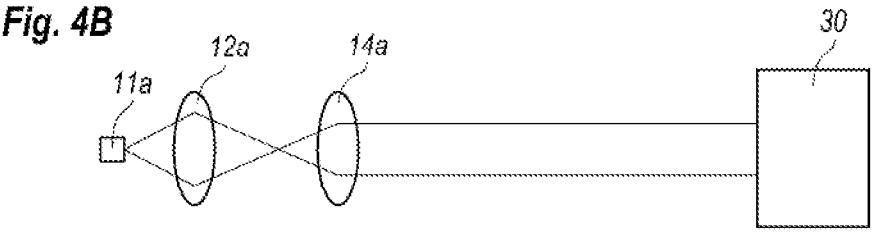
FIG. 4B shows a process to align the second lens in the initial position at which the second lens makes a collimated beam.

Then, as shown in FIG. 4B, the alignment process determines the initial position of the second lens 14a against the first lens 12a. Specifically, setting the special alignment tool above described in downstream of the second lens 14a to extract the optical beam passing through the second lens 14a, and motoring the optical beam by the device 30, the second lens 14a is set such that the optical beam monitored by the device 30 becomes a collimated beam. The set point of the second lens 14a is the initial position thereof.

Figure 4C:
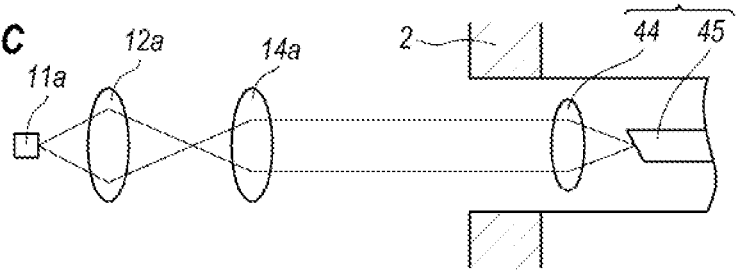
FIG. 4C shows a process to set the dummy port.

Next, as shown in FIG. 4C, a dummy port 40 including a dummy lens 44 and a dummy fiber 45 is prepared. The dummy port 40 emulates the third lens 4 and the coupling fiber 5. That is, the positional relation between the dummy lens 44 and the dummy fiber 45 is same as with the relation between the third lens 4 and the coupling fiber 5. Moreover, the position of the dummy lens 44 against the housing 2 is just same as that of the third lens 4 and the housing.

Figure 4D:
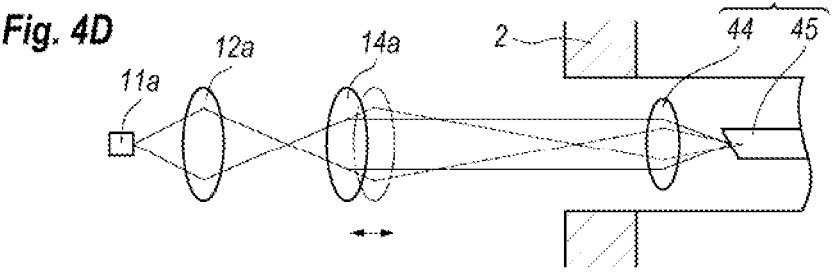
FIG. 4D shows a process to shift the second lens toward the dummy port to get output power within a preset range.

The dummy port 40 is temporarily fixed to the housing 2 in a position where the sleeve unit 3 is to be assembled therewith. Then, the second lens 14a is aligned such that the optical power monitored through the dummy fiber becomes a preset range. Specifically, the second lens is shifted from the initial set point determined in the previous process along the optical axis toward the dummy port 40 as shown in FIG. 4D. Because the second lens 14a is shifted so as to be apart from the first lens 12a, the optical beam passing through the second lens 14a becomes a concentrated beam to form a beam waist between the second lens 14a and the dummy lens 44, and the focal point of the dummy lens 44 in the side of the dummy fiber 45 becomes within the dummy fiber 45. That is, the field pattern of the dummy lens 44 at the end of the dummy fiber 45 becomes blurred to reduce the optical power output from the dummy fiber 45. After the alignment of the second lens 14a, an adhesive, specifically, an ultraviolet curable resin, fixes the second lens 14a.

The process subsequently carries out the optical alignment for the second to fourth lanes as leaving the dummy port 40. That is, the lenses, 12b and 14b, of the second lane are aligned for the dummy port 40 so as to get the optical power output from the dummy fiber 45 becomes a present range, the lenses, 12c and 14c, in the third lane, and the lenses 12d and 14d, in the fourth lanes are also aligned with respect to the dummy port by the manner same with those of the first lane.

The description above assumes that the first lane is first aligned, and the second to fourth lanes are carried out the alignment thereof in this order. Although the order of the alignment is optional, it is preferable to carry out the alignment for a lane accompanying with greater number of reflections. In the present embodiment, referring to FIG. 3, the leftmost lane makes five times reflections from the second lens 14a to the third lane, which means that misalignment easily occurs, or proper alignment is hard to be accomplished. Accordingly, the present embodiment first carries out the alignment for the leftmost lane, 12a and 14a, center two lens are next performed because each lane accompanies with twice reflections, and lastly carries out the rightmost lane, 12d and 14d.

The alignment process of the present embodiment removes the dummy port 40 from the housing 2 after all first and second lenses, 12a to 12d, and 14a to 14d, are aligned with respect to the dummy port 40. Then, the sleeve unit 3 including the third lens 4 and the coupling fiber 5 is fixed to the housing 2 after aligning the sleeve unit in a plane, namely, the outer surface of the housing, perpendicular to the optical axis thereof and along the optical axis of the coupling fiber such that the coupling efficiency between respective LDs, 11a to 11d, and the coupling fiber is revived in the value obtained for the dummy port 40. Specifically, monitoring the optical power output from the coupling fiber 5, the sleeve unit 3 is set in a position at which output power becomes a maximum. Then, the distance between the coupling fiber 5 and the third lens 4 are adjusted so as to revive the optical power output from the coupling fiber 5 in the value obtained for the dummy port 40. Because all second lenses, 14a to 14d, adjust the output power within the preset range by the dummy port 40, the output power obtained through the coupling fiber 5 may be within the present range, or never exceed the maximum power defined in the specification. The sleeve unit 3 may be fixed to the housing 2 by, for instance, the YAG-laser welding.

The alignment process described above moves the second lenses, 14a to 14d, toward the dummy port 40 to adjust the optical power. However, the shift of the second lenses, 14a to 14d, may show a function same with the embodiment. That is, the shift of the second lenses, 14a to 14d, toward the first lenses, 12a to 12d, may bring the same function, namely, the reduction of the optical coupling efficiency against the dummy lens 44.

Figure 5A:
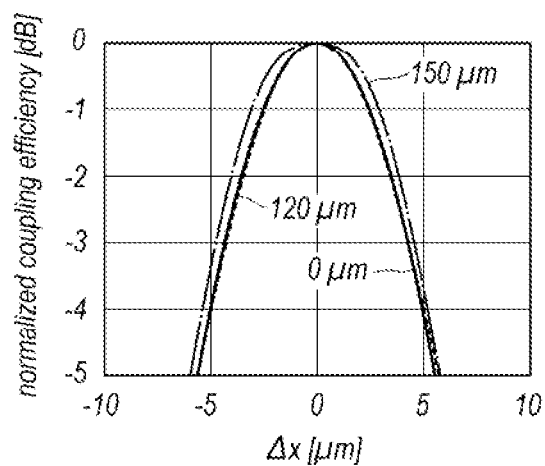
FIG. 5A shows the coupling tolerance when the second lens is shifted toward the first lens and FIG. 5B shows the coupling tolerance when the second lens is shifted toward the third lens.
Figure 5B:
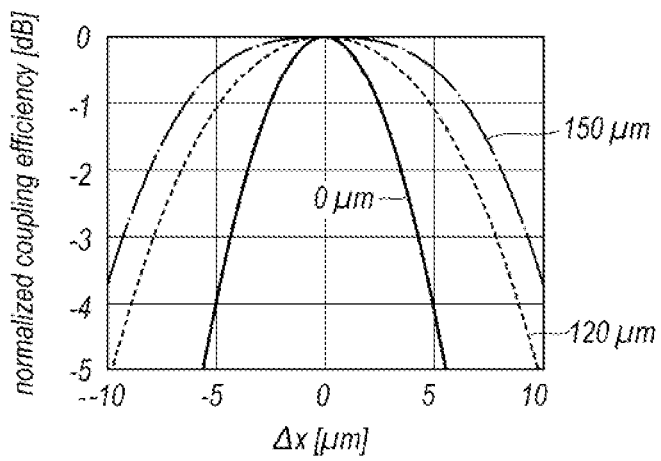

However, the shift toward the third lens 4 may expand the coupling tolerance compared with a condition where the second lens is shift toward the first lens, as shown in FIG. 5B, where FIG. 5A shows a coupling tolerance along a direction perpendicular to the optical axis when the second lenses, 14a to 14d, is shifted toward the first lens by 120 μm and 150 μm, and FIG. 5B shows the coupling tolerance when the second lens, 14a to 14d, is shifted toward the third lens 4 by 120 μm and 150 μm. As shown in FIG. 5B, when the second lens, 14a to 14d, is shifted toward the third lens 4, the coupling tolerance expands. On the other hand, when the second lens, 14a to 14d, is shifted toward the first lens, 12a to 12d, the coupling tolerance is substantially invariant, namely, showing no degradation but any improvement.

Figure 6:
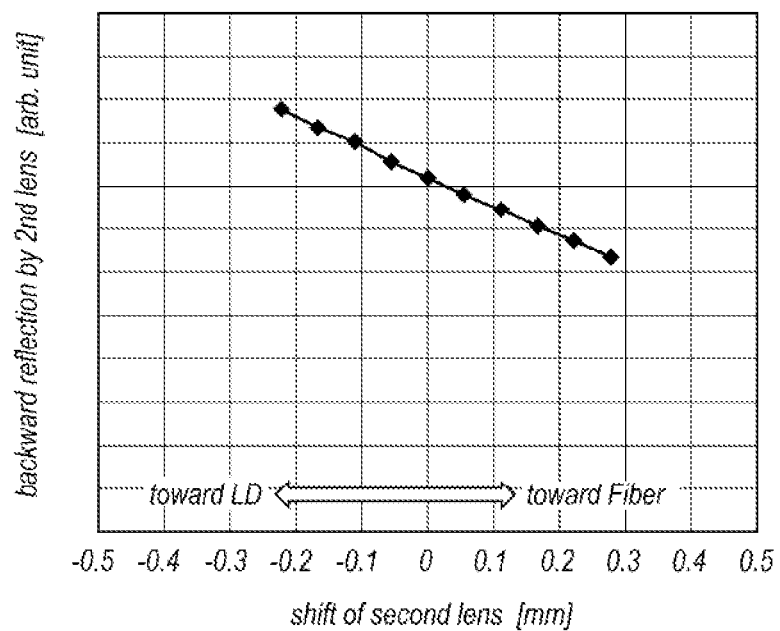
FIG. 6 shows the backward reflection when the second lens is shifted along the optical axis thereof.

Also, as shown in FIG. 6, the shift toward the third lens 4 may reduce the back reflection because of a widened space against the first lens, 12a to 12d. The optical beam output from the first lens, 12a to 12d, is a concentrated beam, while, the optical beam reflected by the second lens 14a to 14d, becomes a divergent beam. Accordingly, when the second lens, 14a to 14d, is apart from the first lens, 12a to 12d, an area of the first lens, 12a to 12d, projected on the divergent pattern of the reflected beam becomes relatively smaller, and stray light reflected backward to the LD, 11a to 11d, becomes smaller. When the second lenses, 14a to 14d, have respective focal length greater than 20 mm, and are shifted toward the third lens 4, the function to enhance the coupling tolerance and to reduce the backward reflection may be consistent. In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of producing an optical module that provides a semiconductor laser diode (LD) as a light source, a first lens coupled to the LD, a second lens coupled to the first lens, a third lens coupled to the second lens and a coupling fiber coupled to the third lens, the optical module outputting an optical signal output from the LD through the first lens, the second lens, the third lens, and the coupling fiber, the method comprising steps of:
   placing the first lens in a first position at which the first lens converts the optical signal output from the LD into a collimated beam;
   shifting the first lens along an optical axis connecting the LD to the first lens so as to be apart from the LD by a preset distance, the optical signal output from the first lens being converted into a concentrated beam by a magnification ratio of 5 to 6;
   placing the second lens in a second position at which the second lens converts the optical signal output from the first lens and passing through the second lens into a collimated beam; and
   adjusting optical power output through the coupling fiber so as to be within a preset range by shifting the second lens from the second position toward the third lens,
   wherein the second lens shows a magnification ratio of unity at a position shifted from the second position by the step of adjusting the optical power.

2. The method of claim 1,
   wherein the steps of placing the first lens in the first position and the second lens in the second position are carried out by setting a tool that makes a parallel translation of the optical beam output from the first lens and the optical beam output from the second lens.

3. The method of claim 1,
   wherein the step of adjusting the optical power includes a step of:
   setting a dummy lens and a dummy fiber in respective positions where the third lens and the coupling fiber are set, adjusting the optical power measured through the dummy fiber to be within the preset range by shifting the second lens toward the dummy lens, and replacing the dummy lens and a dummy fiber to the third lens and the coupling fiber.

4. The method of claim 3,
   wherein the LD, the first lens, and the second lens constitute a signal lane, and the optical module further includes another lane,
   wherein the method further includes steps of, before replacing the dummy lens and the dummy fiber with the third lens and the coupling fiber, adjusting the optical power of the another signal lane measured through the dummy fiber so as to be within the preset range by placing and shifting the first lens in the another signal lane, and placing and shifting the second lens in the another signal lane.

5. The method of claim 3,
   wherein the LD, the first lens, and the second lens constitute a signal lane, and the optical module further includes a plurality of other signal lanes,
   wherein the method includes steps of, before replacing the dummy lens and the dummy fiber with the third lens and the coupling fiber, adjusting optical power of respective signal lanes each measured through the dummy fiber so as to be within the preset range by placing and shifting the first lenses in the other signal lanes and by placing and shifting the second lenses in the other signal lanes, by an order determined based on a number of reflection for the optical beam in the respective signal lanes before arriving the dummy lens.

6. The method of claim 3,
   wherein the step of replacing the dummy lens and the dummy fiber with the third lens and the coupling fiber includes a step of aligning the third lens and the coupling fiber in a plane perpendicular to an optical axis connecting the third lens to the coupling fiber such that the optical power measured through the coupling fiber becomes a maximum.

7. The method of claim 1, further includes a step, before setting the first lens in the first position,
   setting the LD in a preset position, and activating the LD to generate the optical beam.

8. The method of claim 1,
   wherein the step of adjusting the optical power is carried out as maintaining a positional relation between the third lens and the coupling fiber.

* * * * *